(12) United States Patent
Lee et al.

(10) Patent No.: US 12,412,929 B2
(45) Date of Patent: Sep. 9, 2025

(54) ELECTROLYTE SOLUTION FOR A LITHIUM SECONDARY BATTERY AND A LITHIUM SECONDARY BATTERY INCLUDING SAME

(71) Applicants: HYUNDAI MOTOR COMPANY, Seoul (KR); KIA CORPORATION, Seoul (KR); UNIST (ULSAN NATIONAL INSTITUTE OF SCIENCE AND TECHNOLOGY), Ulsan (KR)

(72) Inventors: Yoon Sung Lee, Suwon-si (KR); Jun Ki Rhee, Suwon-si (KR); Hui Beom Nam, Hwaseong-si (KR); Ko Eun Kim, Cheongju-si (KR); Sung Ho Ban, Hwaseong-si (KR); Seung Min Oh, Incheon (KR); Sang Kyu Kwak, Ulsan (KR); Nam Soon Choi, Ulsan (KR); Sung You Hong, Ulsan (KR); Hyeong Jun Kim, Ulsan (KR); Seo Young Jeong, Ulsan (KR); Hyeon Gyu Moon, Ulsan (KR); Min Pyeong Kim, Ulsan (KR)

(73) Assignees: HYUNDAI MOTOR COMPANY, Seoul (KR); KIA CORPORATION, Seoul (KR); UNIST (ULSAN NATIONAL INSTITUTE OF SCIENCE AND TECHNOLOGY), Ulsan (KR)

(*) Notice: Subject to any disclaimer, the term of this patent is extended or adjusted under 35 U.S.C. 154(b) by 525 days.

(21) Appl. No.: 17/990,435

(22) Filed: Nov. 18, 2022

(65) Prior Publication Data
US 2023/0402650 A1    Dec. 14, 2023

(30) Foreign Application Priority Data
Jun. 10, 2022    (KR) .................. 10-2022-0070869

(51) Int. Cl.
*H01M 10/0567*    (2010.01)
*H01M 4/525*    (2010.01)
(Continued)

(52) U.S. Cl.
CPC ....... *H01M 10/0567* (2013.01); *H01M 4/525* (2013.01); *H01M 4/587* (2013.01); *H01M 10/0525* (2013.01); *H01M 2300/004* (2013.01)

(58) Field of Classification Search
CPC ......... H01M 10/0567; H01M 10/0525; H01M 10/0568; H01M 10/0569; H01M 4/525; H01M 4/587; H01M 2300/004
(Continued)

(56) References Cited

U.S. PATENT DOCUMENTS

| 5,965,054 A | 10/1999 | Mcewen et al. |
| 8,715,866 B2 | 5/2014 | Lee et al. |

(Continued)

FOREIGN PATENT DOCUMENTS

| JP | 4569639 B2 | 10/2010 |
| JP | 2014099321 A | 5/2014 |

(Continued)

OTHER PUBLICATIONS

Peiye Liu, et al., Synthesis of 1-Cyanoalkynes and Their Ruthenium(II)-Catalyzed Cycloaddition with Organic Azides to Afford 4-Cyano-1,2,3-triazoles; The Journal of Organic Chemistry; 2018; 41 pp.

*Primary Examiner* — Niki Bakhtiari
*Assistant Examiner* — Ryan K. Blackwell-Rudasill
(74) *Attorney, Agent, or Firm* — Lempia Summerfield Katz LLC

(57) ABSTRACT

An electrolyte for a lithium secondary battery can enhance lifetime and output characteristics in a high-capacity lithium secondary battery. The electrolyte for a lithium secondary battery includes a lithium salt, a solvent, and a functional (Continued)

additive. The functional additive includes 1-(3-((tert-butyldimethylsilyl)oxy)propyl)-5-(4-fluorophenyl)-1H-1,2,3-triazole-4-carbonitrile as a positive electrode film additive.

10 Claims, 4 Drawing Sheets

(51) Int. Cl.
    *H01M 4/587*     (2010.01)
    *H01M 10/0525*     (2010.01)

(58) Field of Classification Search
    USPC .......................................................... 429/326
    See application file for complete search history.

(56) References Cited

U.S. PATENT DOCUMENTS

| | | | |
|---|---|---|---|
| 9,711,823 B2 | 7/2017 | Lee et al. | |
| 11,670,801 B2 * | 6/2023 | Lee | H01M 4/587 |
| | | | 429/188 |
| 11,742,521 B2 * | 8/2023 | Lee | H01M 10/0568 |
| | | | 429/341 |
| 2011/0052999 A1 | 3/2011 | Lee et al. | |
| 2014/0342239 A1 | 11/2014 | Lee et al. | |
| 2015/0311564 A1 | 10/2015 | Ishiji | |

FOREIGN PATENT DOCUMENTS

| | | |
|---|---|---|
| JP | 2018110085 A | 7/2018 |
| KR | 20090079571 A | 7/2009 |
| KR | 20190092149 A | 8/2019 |
| KR | 20200127374 A | 11/2020 |
| WO | 9908299 A1 | 2/1999 |

* cited by examiner

ELECTROLYTE SOLUTION FOR A LITHIUM SECONDARY BATTERY AND A LITHIUM SECONDARY BATTERY INCLUDING SAME

CROSS REFERENCE TO RELATED APPLICATION

The present application claims priority to Korean Patent Application No. 10-2022-0070869, filed on Jun. 10, 2022, the entire content of which are incorporated herein for all purposes by this reference.

BACKGROUND

1. Technical Field

The present disclosure relates to an electrolyte for a lithium secondary battery and to a lithium secondary battery including the electrolyte. More specifically, the present disclosure relates to an electrolyte for a lithium secondary battery, which can enhance lifetime and output characteristics in a high-capacity lithium secondary battery, and to a lithium secondary battery including the electrolyte.

2. Description of the Prior Art

A lithium secondary battery is an energy storage system including a positive electrode for supplying lithium ions upon charging, a negative electrode for receiving lithium ions, an electrolyte serving as a lithium-ion transmission mediator, and a separator for separating the positive electrode and the negative electrode. Electric energy is generated and stored as chemical potentials change with intercalation/deintercalation in the positive and the negative electrode.

Such lithium secondary batteries have been used in mobile electronic devices and are now their use is rapidly expanding as an energy storage system for electric vehicles (EVs) and hybrid electric vehicles (HEVs) that have been successfully commercialized therewith.

In order to increase driving ranges of EVs, studies have been focused on the increase of energy density in lithium secondary batteries. An improvement of high capacity in the positive electrode makes it possible to increase an energy density in a lithium secondary battery.

In order to develop a lithium secondary battery of high energy density, there is a need for the development of novel substances that can overcome performance limits of conventional lithium secondary battery parts such as a positive electrode, a negative electrode, a separator, and an electrolyte.

Particularly, energy density in a battery depends on characteristics of the positive and the negative electrode. Accordingly, a suitable electrolyte should be developed in order that such developed positive and negative electrode substances exhibit excellent electrochemical performance.

When a lamella nickel (Ni)-rich $LiNi_{1-x-y}Co_xMn_yO_2$ (NCM; $1-x-y \geq 0.6$) oxide is used as a high-capacity positive electrode active material, the capacity of the positive electrode can be increased by increasing the content of Ni or by raising a charge voltage. However, the charge/discharge performance rapidly degrades because the residual lithium components ($Li_2CO_3$ and LiOH) present on the positive electrode promote degradation of the electrolyte and increase in interfacial reactivity with the electrolyte, thus accelerating the degeneration rate.

Therefore, positive electrode-electrolyte and interface control techniques are very important. In this context, introduction of an additive technique capable of forming an electrochemically and chemically stable film is required.

The description given in the related art section is only to understand the background of the present disclosure, but should not be recognized as a prior art already known to a person having ordinary skill in the art.

SUMMARY

The present disclosure provides an electrolyte for a lithium secondary battery that can improve lifetime and output characteristics in a lithium secondary battery. The present disclosure also provides a lithium secondary battery including same.

An electrolyte for a lithium secondary battery according to an embodiment of the present disclosure includes a lithium salt, a solvent, and a functional additive. The functional additive includes 1-(3-((tert-butyldimethylsilyl)oxy)propyl)-5-(4-fluorophenyl)-1H-1,2,3-triazole-4-carbonitrile, represented by the following chemical formula 1, as a positive electrode film additive.

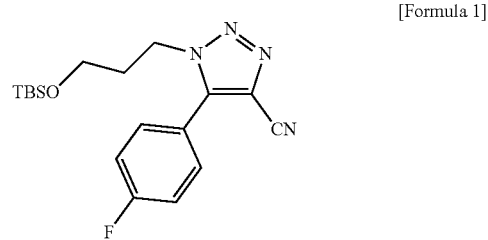 [SMILES: CC(C)(C)[Si](C)(C)OCCCn1nnc(C#N)c1-c1ccc(F)cc1]

[Formula 1]

The positive electrode film additive may be used in an amount in a range of 0.1-1.0 wt. %, based on the weight of the electrolyte.

The positive electrode film additive may be used in an amount in a range of 0.3-0.5 wt. %, based on the weight of the electrolyte.

The functional additive may further include vinylene carbonate (VC) as a negative electrode film additive.

The vinylene carbonate (VC) is used in an amount in a range of 0.5-3.0 wt. %, based on the weight of the electrolyte.

The lithium salt may include $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI), $(CF_3SO_2)_2NLi$, or combinations thereof.

The solvent may include a carbonate-based solvent, an ester-based solvent, an ether-based solvent, a ketone-based solvent, or combinations thereof.

A lithium secondary battery according to an embodiment of the present disclosure includes the electrolyte described herein. The lithium secondary battery may further include: a positive electrode containing a positive electrode active material composed of Ni, Co, and Mn; a negative electrode containing a negative electrode active material including a carbon (C)-based material, a silicon (Si)-based material, or a combination thereof; and a separator interposed between the positive electrode and the negative electrode.

The positive electrode may contain Ni at a content of 80 wt. % or more.

BRIEF DESCRIPTION OF THE DRAWINGS

The above and other aspects, features, and advantages of the present disclosure should become more apparent from the following detailed description taken in conjunction with the accompanying drawings, in which.

DETAILED DESCRIPTION

Figure 1:
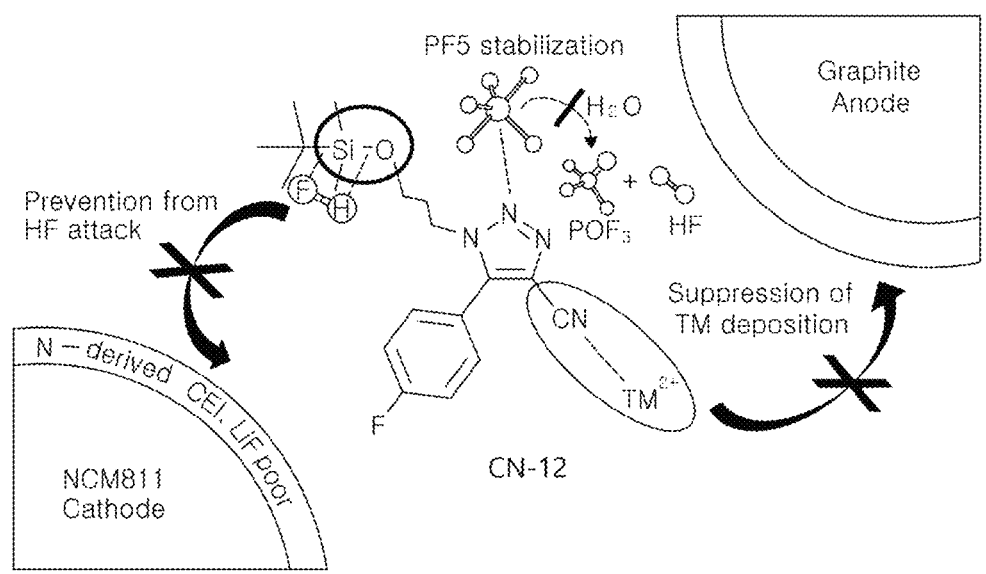
FIG. 1 is a reaction scheme for scavenging HF with a positive electrode film additive according to an embodiment of the present disclosure.

Hereinafter, embodiments of the present disclosure are described in detail in conjunction with the accompanying drawings. However, the present disclosure is not limited to the embodiments disclosed below and may be implemented in various different forms. These embodiments are merely provided to make the disclosure complete and to enable those having ordinary knowledge in the art to which the present disclosure pertains completely understand the scope of the present disclosure.

An electrolyte for a lithium secondary battery according to an embodiment of the present disclosure includes a lithium salt, a solvent, and a functional additive, which are all for use in forming an electrolyte applicable to a lithium-ion battery.

The lithium salt may include $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)2N$, $LiC_4F_9SO_3$, $LiB(C_6H_5)_4$, $Li(SO_2F)_2N$, (LiFSI), $(CF_3SO_2)_2NLi$, or combinations thereof.

The lithium salt may exist at a total concentration in a range of 0.1-3.0 moles or in a range of 0.1-1.2 moles in the electrolyte.

The solvent may include a carbonate-based solvent, an ester-based solvent, an ether-based solvent, a ketone-based solvent, or combinations thereof.

In this regard, examples of the carbonate-based solvent include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), fluoroethylene carbonate (FEC), and vinylene carbonate (VC). The ester-based solvent may be exemplified by γ-butyrolactone (GBL), n-methyl acetate, n-ethyl acetate, n-propyl acetate, etc. As the ether-based solvent, dibutyl ether may be used, but without limitations thereto.

In addition, the solvent may further include an aromatic hydrocarbonate solvent. Examples of the aromatic carbohydrate solvent include benzene, fluorobenzene, bromobenzene, chlorobenzene, cyclohexyl benzene, isopropyl benzene, n-butylbenzene, octyl benzene, toluene, xylene, mesitylene, or combinations thereof.

The functional additive used in the electrolyte according to an embodiment of the present disclosure may employ 1-(3-((tert-butyldimethylsilyl)oxy)propyl)-5-(4-fluorophenyl)-1H-1,2,3-triazole-4-carbonitrile (hereinafter, referred to as "CN-12"), represented by the following chemical formula 1, as a positive electrode film additive:

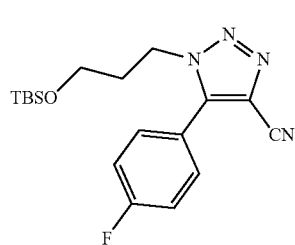

[Formula 1]

Having low LUMO and high HOMO energy levels as calculated by DFT for comparison of HOMO and LUMO orbital energy levels, the positive electrode film additive which is 1-(3-((tert-butyldimethylsilyl)oxy)propyl)-5-(4-fluorophenyl)-1H-1,2,3-triazole-4-carbonitrile (CN-12) is first degraded on the surfaces of positive and negative electrodes to form CEI and SEI layers, with the consequent repression of side reactions with other solvents.

In addition, the positive electrode film additive CN-12 introduces the functional group TMSO, thereby functioning as a scavenger of the acidic component HF which acts as an aging factor in the battery. Hence, a decrease of HF in the electrolyte reduces the formation of LiF which can act as a resistant component in a positive electrode CEI structure and decreases overvoltage in the battery, leading to an improvement in rate capacity.

A film based on triazole, which is a central moiety of the positive electrode film additive CN-12, is formed to stabilize lithium salts. The unshared electron pair occupying the sp2 orbital of the nitrogen atom in the triazole moiety is not included within the pi electron cloud and thus stabilizes moisture or acids, especially $PF_5$ to prevent the additional degradation of $LiPF_6$ salt.

Bearing a nitrile group known to be effective for high-voltage positive electrodes, the positive electrode film additive CN-12 stabilizes transition metals to suppress the cation mixing-induced phase transition on the positive electrode.

In other words, the nitrile group has a triple bond between the carbon and the nitrogen atom in which the unshared electron pair on the nitrogen atom draws electrons more strongly, forming coordination with a metal (Metal-coordination complex).

The NCM811 positive electrode used in lithium ion batteries contains nickel at a content of as high as 80% and undergoes problems One problem is that cation mixing occurs as nickel migrates to the lithium layer due to a decrease in structural stability over charge/discharge cycles. Another problem is that the superficial nickel layer is oxidized by receiving electrons from the surface of the positive electrode and thus dissolves as nickel ions which, in turn, move to the surface of the negative electrode to form a nickel fluoride layer that acts as a barrier against ion delivery.

An additive including a nitrile having a triple bond between the carbon and nitrogen atoms is known to form a film exhibiting excellent properties for high-voltage positive electrodes. The positive electrode film additive CN-12 has affinity for transition metals such as nickel, etc., to prevent the elution of transition metals at the positive electrode. As a result, the additive is expected to prevent the deposition of the metals onto the negative electrode and suppress the cation mixing-caused phase transition on the positive electrode to reduce the heat generated when fully charging the positive electrode.

FIG. 1 is a reaction scheme illustrating the scavenging of HF with the positive electrode film additive (CN-12) according to an embodiment of the present disclosure. The silicon (Si) element in the functional group silyl ether (Si—O) of the positive electrode film additive (CN-12) scavenges fluorine (F) while hydrogen (H) is removed by oxygen (O). As a result, CEI destruction and TM elution can be prevented.

In addition, the nitrile group of the positive electrode film additive (CN-12) contributes to the charge neutralization on the surface of the positive electrode through transition metal stabilization. In this regard, the nickel ions are stabilized to repress cation mixing-caused phase transition (layered-to-spinel/rock-salt phase) on the positive electrode.

Also, the triazole-derived structure of the positive electrode film additive (CN-12) help the $PF_5$ stabilization of nitrogen, which acts as a Lewis base.

The positive electrode film additive may be added in an amount in a range of 0.1-1.0 wt. % or in a range of 0.1-0.3 wt. %, based on the total weight of the electrolyte.

When added in an amount less than 0.1 wt. %, the positive electrode film additive contributes only little effect because it cannot sufficiently form a surface protecting film on the surface of the positive electrode active material and the negative electrode active material. More than 1.0 wt. % of the positive electrode film additive causes the excessive formation of the surface protecting layers CEI and SEI, increasing a cell resistance, which results in a decreased lifetime.

The functional additive may further include a negative electrode film additive functioning to form a film on a negative electrode in addition to the positive electrode film additive. For example, vinylene carbonate (hereinafter referred to "VC") may be used as the additional negative electrode film additive.

VC, used as a negative electrode film additive, may be added in an amount in a range of 0.5-3.0 wt. % or in a range of 1.5-2.5 wt. %, based on the weight of the electrolyte.

Less than the lower limit of the negative electrode film additive reduces long-term lifetime characteristics of the cell. When exceeding the upper limit, the amount of the negative electrode film additive excessively forms a surface protecting layer and causes an increase in cell resistance, with the resultant decrease of battery output.

According to an embodiment thereof, the present disclosure provides a lithium secondary battery including the electrolyte described above, a positive electrode, a negative electrode, and a separator.

The positive electrode includes an NCM-based positive electrode active material composed of Ni, Co, and Mn. Particularly, the positive electrode active material in the positive electrode according to an embodiment is composed only of an NCM-based positive electrode active material containing 80 wt. % or more of Ni.

The negative electrode includes a carbon (C)-based negative electrode active material, a silicon (Si)-based negative electrode active material, or a combination thereof.

The carbon (C)-based negative electrode active material may include artificial graphite, natural graphite, graphitized carbon fibers, graphitized mesocarbon microbeads, fullerene, amorphous carbon, or combinations thereof.

The silicon (Si)-based negative electrode active material may include a silicon oxide, a silicon particle, a silicon alloy particle, or combinations thereof.

For the positive electrode and the negative electrode, the corresponding active material is mixed with a conductive material, a binder, and a solvent to prepare an electrode slurry. This electrode slurry is applied directly on a current collector and dried to manufacture the positive electrode or the negative electrode. In this regard, the current collector may be formed of aluminum (Al), but with no limitations thereto. Such electrode manufacturing methods are well known in the art and thus a detailed description is not given thereof.

The binder acts to well aggregate active material particles each other or strongly attach them to a current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, ethylene oxide-bearing polymers, polyvinyl pyrrolidone, polyurethane, polytetrafluoroethylene, polyvinylidene fluoride, polyethylene, polypropylene, styrene butadiene rubber, acrylated styrene butadiene rubber, an epoxy resin, and nylon.

The conductive material is used to confer conductivity on the electrodes. So long as it is of electron conductivity without causing a chemical change in the battery, any conductive material is available. Examples of the conductive material include natural graphite, artificial graphite, carbon black, acetylene black, Ketjenblack, carbon fibers, and metal powders or fibers such as copper, nickel, aluminum, silver, etc., and metallic fibers. In addition, at least one conductive material such as a polyphenylene derivative may be further used.

The separator prevents the formation of a short circuit between the positive electrode and the negative electrode while providing migration channels of lithium ions. This separator may well-known one, for example, a polyolefinic membrane such as polypropylene, polyethylene, polyethylene/polypropylene, polyethylene/polypropylene/polyethylene, polypropylene/polyethylene/polypropylene, etc., or a multiple membrane, microporous film, woven fabric, or non-woven fabric thereof. Alternatively, a porous polyolefin film coated with highly stable resin may be used.

Hereinafter, the present disclosure is explained with reference to Examples and Comparative Examples.

<TEST 1> Test for Initial Cell Efficiency (Discharge/Charge) and High-Temperature Lifetime Characteristic at High Temperature (45° C.) According to Amount of Positive Electrode Film Additive Upon Use of Graphite as Negative Electrode To examine initial cell efficiency and high-temperature lifetime characteristics according to the presence and absence of the positive electrode film additive in the electrolyte and the amount of the positive electrode film additive, if present, upon the use of graphite as the negative electrode, a measurement was made of initial cell efficiency and discharge retention after 100 cycles at a high temperature (45° C.) while the amount of the positive electrode film additive CN-12 was changed as shown in Table 1, below, with the amount of the negative electrode film additive VC fixed at 1.0 wt. %. The results are summarized in Table 1 and depicted in FIGS. 2 and 3.

In this regard, the cycles were performed under the conditions of cut-off: 2.5-4.2 V, C-rate 1C, and temperature: 45° C. For preparing electrolytes, 0.5M $LiPF_6$+0.5 LiFSI was used as a lithium salt and a mixture of ethylene carbonate (EC):ethylmethyl carbonate (EMC):diethyl carbonate (DEC) at a volume ratio of 25:45:30 as a solvent The positive electrode was made of NCM811 while the negative electrode was a graphite electrode.

TABLE 1

| | Additive | | | Cell Initial Efficiency (%) | Lifetime at high temp. |
| --- | --- | --- | --- | --- | --- |
| | VC | LiPO$_2$F$_2$ | CN-12 | (charge/discharge) | (%) @100 cyc |
| C. Ex. 1 | 1.0 | — | — | 87.9 | 90.8 |
| C. Ex. 2 | 1.0 | 0.5 | — | 90.3 | 88.9 |
| Ex. 1 | 1.0 | — | 0.1 | 89.6 | 90.4 |
| Ex. 2 | 1.0 | — | 0.3 | 90.3 | 91.9 |
| Ex. 3 | 1.0 | — | 1.0 | 88.2 | 87.5 |

Figure 2:
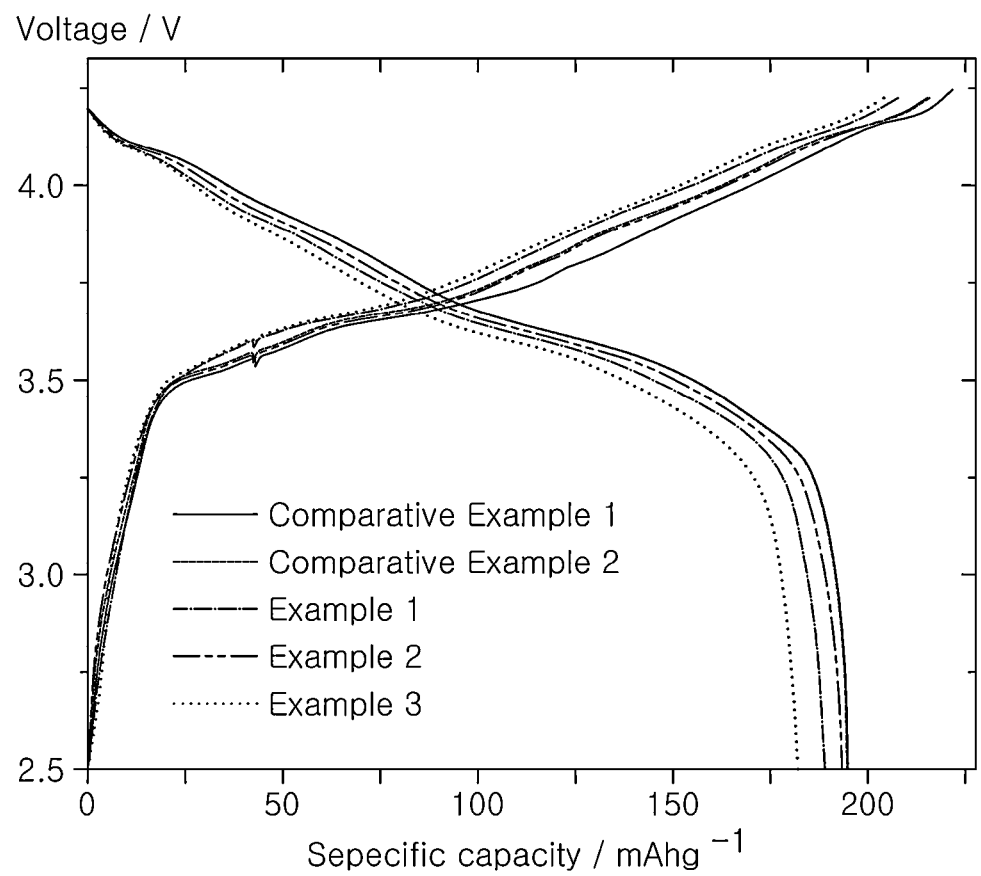
FIG. 2 shows curves of cell initial charge/discharge efficiencies according to electrolyte compositions of the Examples and Comparative Examples.
Figure 3:
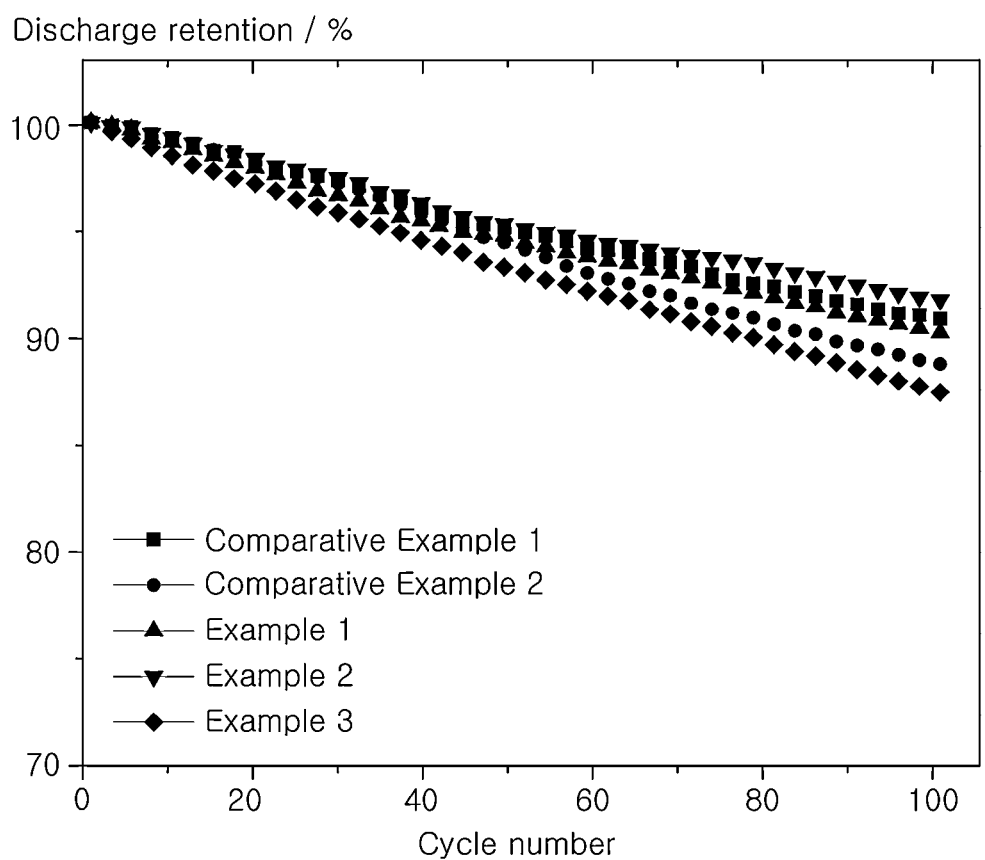
FIG. 3 shows curves of high-temperature lifetimes according to electrolyte compositions of the Examples and Comparative Examples.

FIG. 2 shows curves of cell initial charge/discharge efficiencies according to electrolyte compositions of the Examples and Comparative Examples. FIG. 3 shows curves of high-temperature lifetimes according to electrolyte compositions of the Examples and Comparative Examples.

As shown in Table 1 and FIGS. 2 and 3, the initial cell efficiency was improved in all Examples 1-3 in which the positive electrode film additive (CN-12) was added in amounts of 0.1 wt. %, 0.3 wt. %, and 1.0 wt. %, respectively, compared to Comparative Example 1 where the positive electrode film additive was not added to the electrolyte.

In addition, the cell initial efficiencies were similar to that of Comparative Example 2 where LiPO$_2$F$_2$ was used as a negative electrode film additive in an amount of 0.5 wt. %.

In terms of high-temperature lifetime, all Examples 1-3 are similar to or higher than Comparative Example 1.

The high-temperature lifetime characteristics were similar to or greater than that of Comparative Example 2.

Particularly, the cell initial efficiency and high-temperature lifetime were significantly improved in Example 2, compared to Comparative Example 1.

<TEST 2> Test for Rate Capability at Room Temperature (25° C.) According to Amount of Positive Electrode Film Additive Upon Use of Graphite as Negative Electrode To examine rate capability at room temperature (25° C.) according to the presence and absence of the positive electrode film additive in the electrolyte and the amount of the positive electrode film additive, if present, upon the use of graphite as the negative electrode, a measurement was made of rate capability at room temperature (25° C.) while the amount of the positive electrode film additive CN-12 was changed as shown in Table 2, below, with the amount of the negative electrode film additive VC fixed at 1.0 wt. %. The results are summarized in Table 2 and depicted in FIG. 4.

In this regard, the cycles were performed under the conditions of cut-off: 2.5-4.2 V, C-rate 0.5C/1.0C/2.0C/3.0C/0.5C, and temperature: 25° C. For preparing electrolytes, 0.5M LiPF$_6$+0.5 LiFSI was used as a lithium salt and a mixture of ethylene carbonate (EC):ethylmethyl carbonate (EMC):diethyl carbonate (DEC) at a volume ratio of 25:45:30 as a solvent.

The positive electrode was made of NCM811 while the negative electrode was a graphite electrode.

TABLE 2

| | Additive | | | Rate Capability |
| --- | --- | --- | --- | --- |
| | VC | LiPO$_2$F$_2$ | CN-12 | @3 C |
| C. Ex. 1 | 1.0 | — | — | 72.9 |
| C. Ex. 2 | 1.0 | 0.5 | — | 76.3 |
| Ex. 1 | 1.0 | — | 0.1 | 77.6 |
| Ex. 2 | 1.0 | — | 0.3 | 79.3 |
| Ex. 3 | 1.0 | — | 1.0 | 72.5 |

Figure 4:
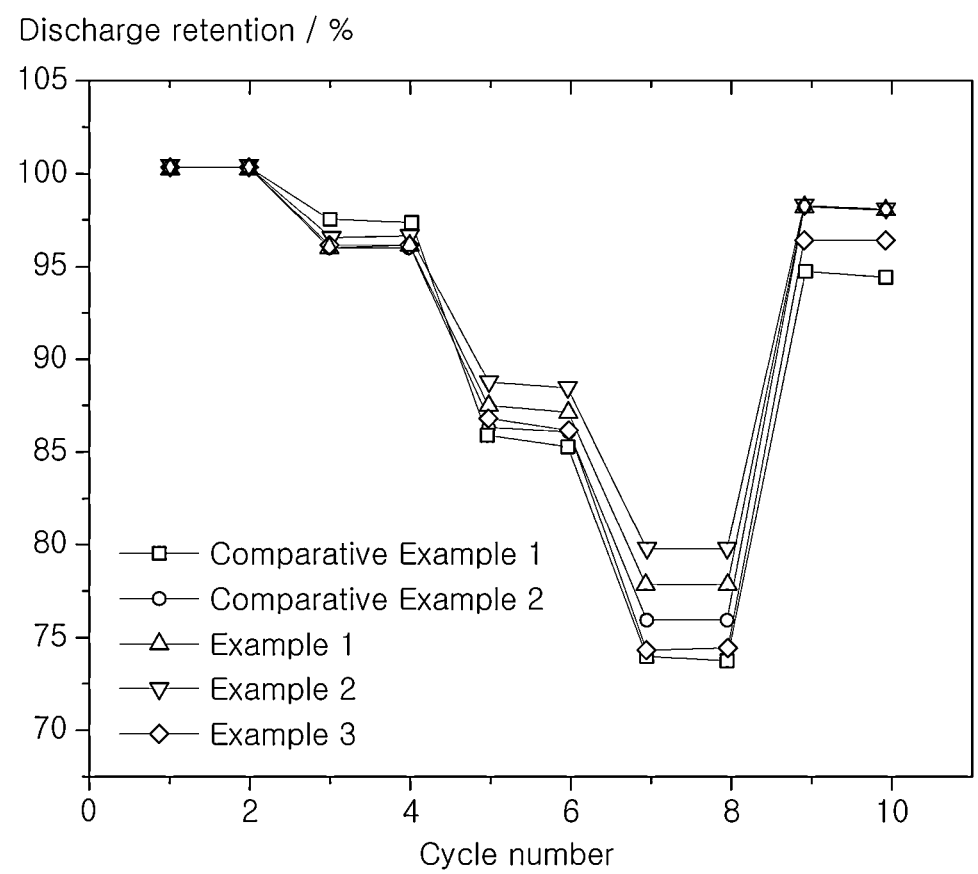
FIG. 4 is a plot of rate capability according to electrolyte compositions of the Examples and Comparative Examples.

FIG. 4 is a plot of rate capability according to electrolyte compositions of the Examples and Comparative Examples.

As shown in Table 2 and FIG. 4, the rate capability was similar or improved in all Examples 1-3 in which the positive electrode film additive (CN-12) was added in amounts of 0.1 wt. %, 0.3 wt. %, and 1.0 wt. %, respectively, compared to Comparative Example 1 where the positive electrode film additive was not added to the electrolyte.

In addition, the rate capability was similar to or higher than that of Comparative Example 2 where LiPO$_2$F$_2$ was used as a negative electrode film additive in an amount of 0.5 wt. %.

Particularly, Examples 1 and 2 exhibited significantly improved rate capability, compared to Comparative Examples 1 and 2.

Therefore, as can be understood from the data of the tests, the initial cell efficiency, high-temperature lifetime, and rate capability characteristics were improved upon the addition of the positive electrode film additive (CN-12) of the present disclosure in an amount in a range of 0.1-1.0 wt. % or in a range of 0.1-0.3 wt. %, compared to the absence of the positive electrode film additive (CN-12) of the present disclosure.

As described hitherto, according to embodiments of the present disclosure, the electrolyte can form a highly ion-conductive, protective film on the surface of a positive electrode active material to prevent the degradation of the cell, thereby extending the lifetime of the lithium secondary battery and enhancing output characteristics thereof.

Furthermore, the electrolyte guarantees lifetime stability at high temperatures, contributing to an improvement of commercial value in the battery.

It will be appreciated by those having ordinary knowledge in the art to which the present disclosure pertains that the present disclosure may be practiced in other specific forms without changing the technical spirit and essential features of the present disclosure. Therefore, it should be understood that the above-described embodiments are illustrative but not restrictive in all aspects. The scope of the present disclosure is defined by the scope of the attached claims, rather than the detailed description. It should be appreciated that all variations and modifications derived from the scope of the claims and the equivalent concepts thereof are included in the scope of the present disclosure.

What is claimed is:

1. An electrolyte for a lithium secondary battery, the electrolyte comprising:
 a lithium salt;
 a solvent; and
 a functional additive including 1-(3-((tert-butyldimethylsilyl)oxy)propyl)-5-(4-fluorophenyl)-1H-1,2,3-triazole-4-carbonitrile represented by the following formula as a positive electrode film additive:

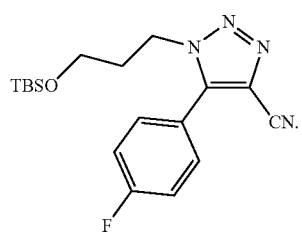 [SMILES: CC(C)(C)[Si](C)(C)OCCCn1nnc(C#N)c1-c1ccc(F)cc1]

2. The electrolyte of claim 1, wherein the positive electrode film additive is in a range of 0.1-1.0 wt. %, based on a weight of the electrolyte.

3. The electrolyte of claim 1, wherein the positive electrode film additive is in a range of 0.1-0.3 wt. %, based on a weight of the electrolyte.

4. The electrolyte of claim 1, wherein the functional additive further comprises vinylene carbonate (VC) as a negative electrode film additive.

5. The electrolyte of claim 4, wherein the vinylene carbonate (VC) is in a range of 0.5-3.0 wt. %, based on the weight of the electrolyte.

6. The electrolyte of claim 1, wherein the lithium salt comprises $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$, (LiFSI), $(CF_3SO_2)_2NLi$, or combinations thereof.

7. The electrolyte of claim 1, wherein the solvent comprises a carbonate-based solvent, an ester-based solvent, an ether-based solvent, a ketone-based solvent, or combinations thereof.

8. A lithium secondary battery including an electrolyte comprising:
    a lithium salt;
    a solvent; and
    a functional additive including 1-(3-((tert-butyldimethylsilyl)oxy)propyl)-5-(4-fluorophenyl)-1H-1,2,3-triazole-4-carbonitrile represented by the following formula as a positive electrode film additive:

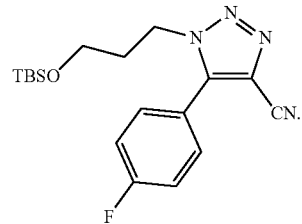 [SMILES: CC(C)(C)[Si](C)(C)OCCCn1nnc(C#N)c1-c1ccc(F)cc1]

9. The lithium secondary battery of claim 8, further comprising:
    a positive electrode containing a positive electrode active material including Ni, Co, and Mn;
    a negative electrode containing a negative electrode active material including a carbon (C)-based material, a silicon (Si)-based material, or a combination thereof; and
    a separator interposed between the positive electrode and the negative electrode.

10. The lithium secondary battery of claim 9, wherein the positive electrode comprises 80 wt. % or more Ni.

* * * * *